United States Patent
Miersch-Wiemers et al.

(10) Patent No.: US 8,752,526 B2
(45) Date of Patent: Jun. 17, 2014

(54) METHOD AND APPARATUS FOR REDUCING UNCONTROLLED COMBUSTION IN AN INTERNAL COMBUSTION ENGINE

(75) Inventors: Oliver Miersch-Wiemers, Stuttgart (DE); Uwe Mueller, Cleebronn (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 13/048,482

(22) Filed: Mar. 15, 2011

(65) Prior Publication Data

US 2011/0238283 A1    Sep. 29, 2011

(30) Foreign Application Priority Data

Mar. 25, 2010   (DE) .......................... 10 2010 003 291

(51) Int. Cl.
   *F02M 7/00*   (2006.01)
(52) U.S. Cl.
   USPC ...................................... 123/435; 123/406.41
(58) Field of Classification Search
   USPC ............... 123/434, 435, 693, 406.41, 406.42, 123/406.43
   See application file for complete search history.

(56) References Cited

U.S. PATENT DOCUMENTS

| | | | | |
|---|---|---|---|---|
| 4,372,119 A * | 2/1983 | Gillbrand et al. | ............... | 60/600 |
| 4,381,662 A * | 5/1983 | Jiewertz | ....................... | 73/35.01 |
| 4,448,065 A * | 5/1984 | Meurer | ...................... | 73/114.77 |
| 7,861,689 B2 * | 1/2011 | Haug et al. | ............... | 123/406.21 |
| 2007/0157912 A1 * | 7/2007 | Ritter et al. | .................... | 123/679 |
| 2012/0271536 A1 * | 10/2012 | Hamedovic et al. | .......... | 701/111 |
| 2013/0096809 A1 * | 4/2013 | Haeming et al. | .............. | 701/111 |

FOREIGN PATENT DOCUMENTS

| DE | 10 2007 039 036 A1 | 3/2008 |
|---|---|---|
| DE | 10 2007 024 415 B3 | 1/2009 |
| WO | WO 00/37796 | 6/2000 |

* cited by examiner

*Primary Examiner* — John Kwon
(74) *Attorney, Agent, or Firm* — Kenyon & Kenyon LLP

(57) ABSTRACT

The invention relates to a method for reducing uncontrolled combustions in an internal combustion engine, which occur independently of the ignition by a spark plug, wherein uncontrolled combustions are detected in the internal combustion engine (1). In order to reduce the damaging effects of the uncontrolled combustions to the internal combustion engine, the incipient uncontrolled combustion (B) is reduced after said incipient uncontrolled combustion (B) has been detected.

10 Claims, 4 Drawing Sheets

METHOD AND APPARATUS FOR REDUCING UNCONTROLLED COMBUSTION IN AN INTERNAL COMBUSTION ENGINE

This application is claims benefit of Serial No. 10 2010 003 291.3, filed 25 Mar. 2010 in Germany and which application is incorporated herein by reference. To the extent appropriate, a claim of priority is made to the above disclosed application.

BACKGROUND

The invention relates to a method for reducing uncontrolled combustions in an internal combustion engine, which occur independently of the ignition by a spark plug, wherein the uncontrolled combustions in the in the internal combustion engine are detected and a device is provided for carrying out the method.

In a gasoline engine, a combustion of the fuel/air mixture supplied leads to the vehicle being set into the driving operation, respectively the driving operation being maintained. The combustion of the fuel/air mixture is thereby initiated by the spark of a spark plug. While the flame front spreads in the combustion chamber, self-ignitions occur as a result of high pressures and temperatures. The combustion, which then occurs abruptly, causes a precipitous increase in pressure which in turn produces a pressure wave. Said wave spreads and impacts the walls bounding the combustion chamber, whereat the high frequency vibrations are converted into structure-borne noise. In controlling the gasoline engine, these vibrations are detected by knock sensors (structure-borne sound sensors) and are taken into account by a knock control system in order to prevent damage to the engine. In so doing, said gasoline engine is always operated in an optimally efficient manner at the knock threshold, whereby damage to said engine as a result of knocking is avoided.

Besides the knocking combustion just described, self-ignitions, however, also occur, which are caused by hot spots in the combustion chamber, oil droplets or hot residual gas zones in the fuel/air mixture. Such self-ignitions can also occur as pre-ignitions prior to the ignition spark occurring or as post-ignitions after said ignition spark occurs. The self-ignitions are characterized by compression pressures with high pressure amplitudes and/or gradients, which can very quickly lead to engine damage.

SUMMARY

The aim underlying the invention is therefore to specify a method and a device for reducing uncontrolled combustions, wherein and whereby the damaging effects of the uncontrolled combustions to the internal combustion engine are reduced.

According to the invention, the aim is thereby met by the incipient uncontrolled combustion being reduced after the detection of the same. The advantage of this invention is that measures are immediately implemented for reducing the uncontrolled combustion in the same operating cycle of the internal combustion engine in which said uncontrolled combustion is detected already as it develops. This leads to a complete formation of the uncontrolled combustion being prevented, and in so doing the otherwise usual high pressure values of the uncontrolled combustion are reduced. Consequently, the stress on the internal combustion engine is reduced in the current operating cycle.

In order to detect the uncontrolled combustion, a pressure in the combustion chamber of the internal combustion engine is advantageously compared with a predetermined pressure threshold dependent on said engine's operating point. In so doing, the presence of an uncontrolled combustion is suggested if the pressure threshold is exceeded. An uncontrolled combustion can be very easily detected by means of a pressure measurement in the combustion chamber. In addition, this procedure leads to a particularly early detection of uncontrolled combustions, whereby counter measures can be very quickly initiated and the danger of damaging the engine is thereby prevented.

As an alternative procedure for detecting the uncontrolled combustions, a gradient of the increase in pressure in the combustion chamber is compared with a predetermined gradient threshold dependent on the engine's operating point. In so doing, the presence of uncontrolled combustions is suggested if the gradient threshold is exceeded. The evaluation of the pressure gradient allows for a very quick determination of an uncontrolled combustion, which in turn results in a measure for limiting the uncontrolled combustion being initiated in the operating cycle of the internal combustion engine in which said uncontrolled combustion is detected. The formation of the uncontrolled combustion is thus contained.

In a further alternative, the position of the increase in pressure in the combustion chamber is compared with an outputted ignition angle. Because a crankshaft sensor, which is already installed for other processes in the internal combustion engine, is used for detecting said position, additional sensors can be dispensed with. This results in a cost effective and constructively simple solution.

In one embodiment, fuel is additionally introduced into the combustion chamber of the internal combustion engine for reducing the uncontrolled combustions in progress. By introducing fuel immediately after detecting the presence of an uncontrolled combustion, a vaporization of the fuel occurs, which causes the fuel/air mixture to cool down, whereby the combustibility thereof is reduced. The combustibility of the fuel/air mixture is additionally reduced by the pronounced enrichment thereof. Both effects lead to a reduction of the uncontrolled combustion and thus to a reduction of the stress on the engine.

In a modification to the above embodiment, the injection of fuel is discontinued for at least one ensuing combustion cycle of the internal combustion engine after completing the additional introduction of fuel into the combustion chamber of an affected cylinder. It is thereby assured that the uncontrolled combustion has completely subsided before a new fuel/air mixture is again injected into said combustion chamber of the internal combustion engine.

A modification to the invention relates to a device for reducing uncontrolled combustions in an internal combustion engine, which occur independently of the ignition by a spark plug, the uncontrolled combustions being thereby detected. In order to minimize the danger of damage to the internal combustion engine, means are present which reduce the incipient uncontrolled combustion after said uncontrolled combustion has been detected. By means of an early detection of the uncontrolled combustions, the measures for reducing the damaging effects of said uncontrolled combustions can still be initiated in the measuring phase while said uncontrolled combustions are being formed; thus enabling said uncontrolled combustions to be reduced in their intensity, which leads to a reduction of the stress on said internal combustion engine by said uncontrolled combustions.

In one embodiment, each cylinder of the internal combustion engine has a combustion chamber pressure sensor, the signals of which are scanned by a microcontroller, which in each case compares the amplitude of the pressure signal and/or the gradient of the pressure signals with a reference pressure. If the reference pressure is exceeded, the microcontroller immediately induces fuel to be fed into the monitored cylinder of said internal combustion engine. By means of the software-based processing of the pressure signals in the microcontroller, any hardware-based outlay for checking for the presence of uncontrolled combustions can be omitted.

It is advantageous for a first reference voltage corresponding to the pressure threshold value, which is dependent on the engine's operating point, to be present at a first output of the microcontroller and for a second reference voltage corresponding to the gradient threshold value, which is dependent on the engine's operating point, to be present at a second output. Said first and second reference voltages are then fed to a first, respectively second, comparator, the signal of the combustion chamber sensor being provided to both comparators and the output of both comparators being connected to an injection control unit, which activates an injection valve for an additional fuel feed into the monitored cylinder of the internal combustion engine if the first and/or second reference voltage is exceeded. By means of the selective activation of the two outputs of the microcontroller, measuring windows can be simply created. Furthermore, such an analog signal evaluation offers the possibility of an especially short response time to an incipient uncontrolled combustion and is therefore faster than a digital solution.

In a modification, the microcontroller is a constituent part of the combustion chamber pressure sensor. In so doing, particularly the combustion chamber pressure sensor having the evaluation circuit constitutes a complex component, which can be connected up to any control unit to initiate an injection of fuel.

The invention allows for numerous embodiments. One of those is explained in detail using the figures depicted in the drawing.

BRIEF DESCRIPTION OF THE DRAWINGS

The following are shown.

DETAILED DESCRIPTION

Figure 1:
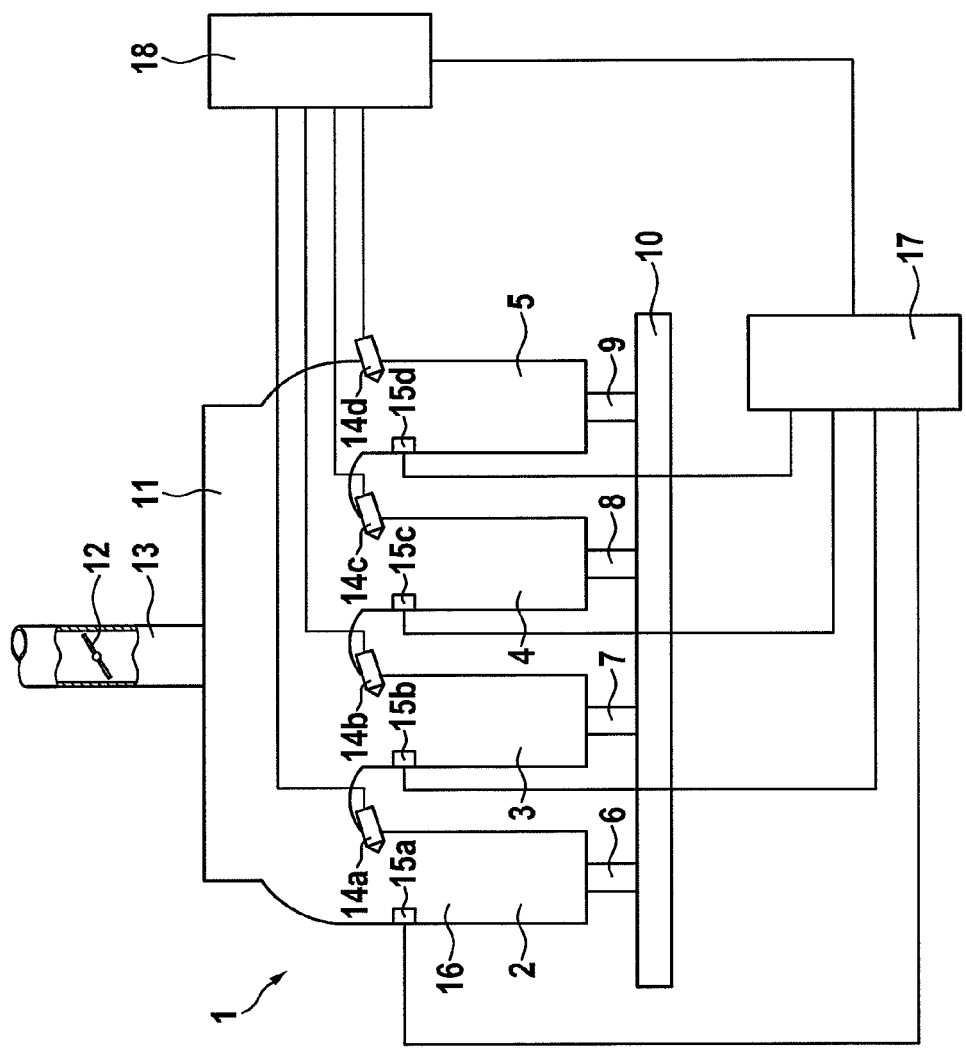
FIG. 1: Device for determining an uncontrolled combustion in a gasoline engine

The same features are denoted with the same reference numerals.

FIG. 1 shows a device for measuring a combustion in a gasoline engine 1. The gasoline engine 1 configured as a turbocharger has in this example four cylinders 2, 3, 4, 5, the pistons of which are not depicted. Said pistons move in the cylinders 2, 3, 4, 5 and are connected in each case to the crankshaft 10 via a connecting rod 6, 7, 8, 9 and drive said crankshaft due to pressure changes caused by the combustions. The cylinders 2, 3, 4, 5 are connected to a compressor 11, the air intake pipe 13 of which is closed by a butterfly valve 12. An injection nozzle 14a, 14b, 14c, 14d extends into each cylinder 2, 3, 4, 5 for the injection of fuel, whereby a fuel/air mixture forms.

A combustion chamber pressure sensor 15a, 15b, 15c, 15d is disposed in the combustion chamber 16 of each cylinder 2, 3, 4, 5. The combustion chamber pressure sensor 15a, 15b, 15c, 15d continually detects the pressure in said combustion chamber 16 of each cylinder 2, 3, 4, 5 across all combustion cycles of the gasoline engine 1 and forwards said pressure to a control unit 17, which classifies the combustions based on the pressure ascertained. The control unit 17 is furthermore connected to the individual fuel injection nozzles 14a, 14b, 14c, 14d.

Figure 2:
FIG. 2: Depiction of the cylinder pressure curves with and without an uncontrolled combustion

When the butterfly valve 12 is opened, air flows into the intake manifold 11 and therefore into the cylinders 2, 3, 4, 5, in which fuel is injected through the nozzles 14a, 14b, 14c, 14d. A combustion is triggered consecutively in the cylinders 2, 3, 4, 5 by a spark from a spark plug which is not depicted. The combustion causes an increase in pressure in the cylinder 2, 3, 4, 5, which is transferred to the crankshaft 10 via the piston and the connecting rod 6, 7, 8, 9 and sets said crankshaft 10 in motion. The pressure p versus the changing crankshaft angle v, which arises in the case of a normal, controlled combustion of this type, is depicted in FIG. 2, curve A.

Besides the controlled combustions, combustions occur which have a very early initiation of combustion, respectively combustion positions that still lie prior to the moment of ignition of the spark plug. These combustions are designated as super knocks. Such a super knock is depicted by curve B of FIG. 2, wherein it can be seen that super knocks generate significantly higher pressures p, which are harmful to the gasoline engine 1, in comparison to normal combustions. For comparison a knocking combustion is depicted as curve C in FIG. 2, which barely avoids damage to the gasoline engine due to the setting of the ignition angle corresponding to a retarded crankshaft angle v. In addition, the compression curve D is depicted, which compresses the pressure p in the combustion chamber 16 in the direction of upper top dead center by means of the motion of the cylinders 2, 3, 4, 5. As can be seen from the comparison of the curves in FIG. 2, a super knock develops prior to the moment of ignition ZZP and has pressure amplitudes, which greatly exceed the amplitude of the other combustion. Moreover, a super knock is characterized by a very steep increase in pressure.

Figure 3:
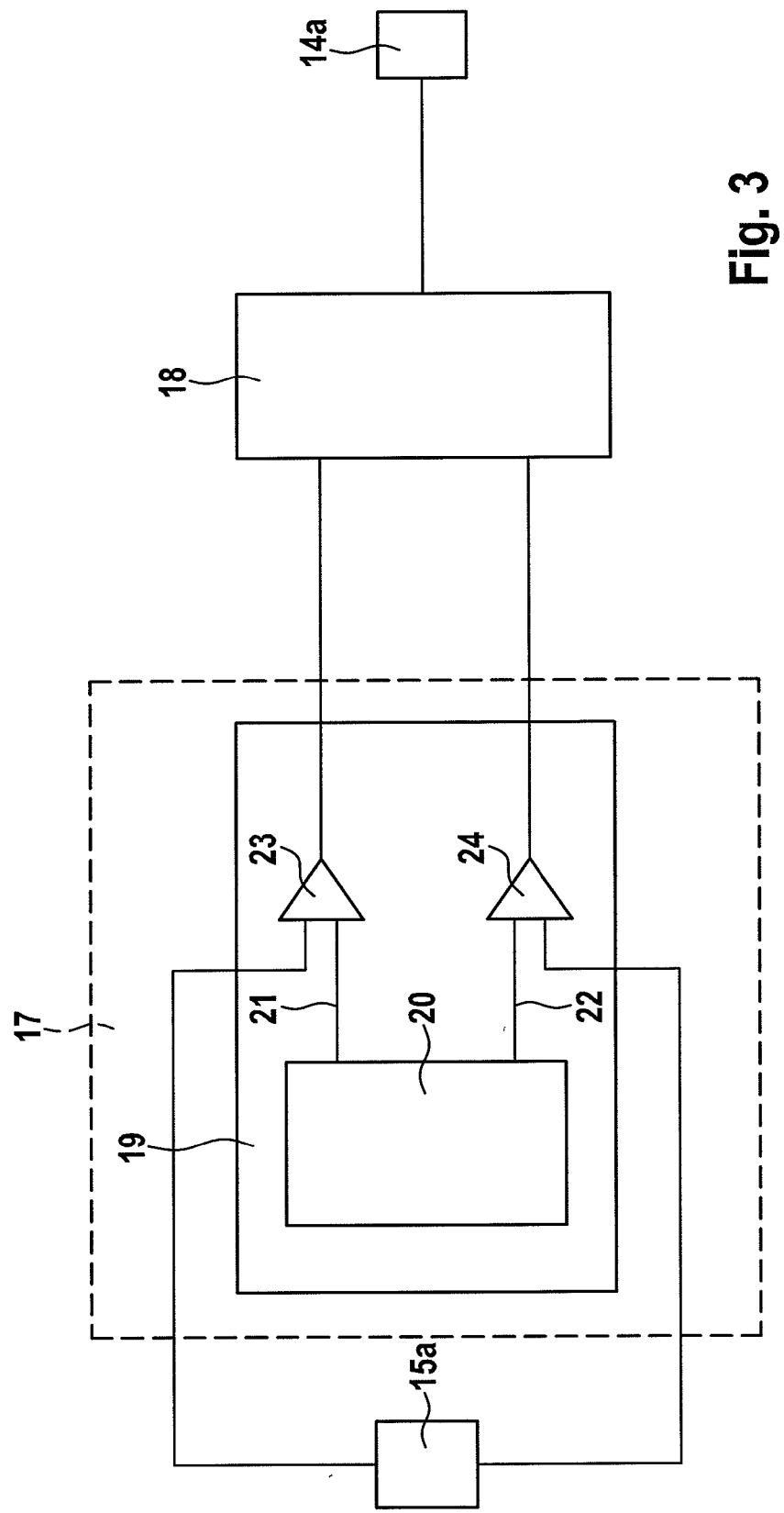
FIG. 3: Block diagram for detecting and evaluating uncontrolled combustions

In order to determine whether a super knock is present, a circuit is used as depicted in FIG. 3, wherein for the sake of simplicity only one combustion chamber pressure sensor 15a and one injection valve 14a, which are contained in cylinder 2, are considered. The control unit 17 comprises a printed circuit board, on which a microcontroller 20 and two comparators are disposed. The microcontroller 20 thereby has two outputs 21 and 22, a threshold voltage being applied at each output. A pressure threshold voltage is present at the output 21, whereas a pressure gradient threshold voltage is s set at the output 22. The pressure threshold value, respectively the pressure gradient threshold value, is thereby set as a function of the operating point of the gasoline engine 1 or the load thereof. Said output 21 of the microcontroller is connected to an input of the first comparator 23, a second input of which receives a signal of the combustion chamber pressure sensor 15a. The output 22 of said microcontroller 20 is connected to the first input of the second comparator 24, the second input of which likewise receives the signal of said combustion chamber pressure sensor 15a. If the signal of the combustion chamber pressure sensor 15a exceeds either the pressure threshold value or the gradient threshold value, the comparator 23 or 24 produces an output signal, which is fed in each case to the injection control unit 18. Immediately upon receiving a comparator output signal, said injection control unit 18 activates the injection valve so that fuel is additionally supplied to the combustion chamber 16 of the cylinder 2.

Figure 4:
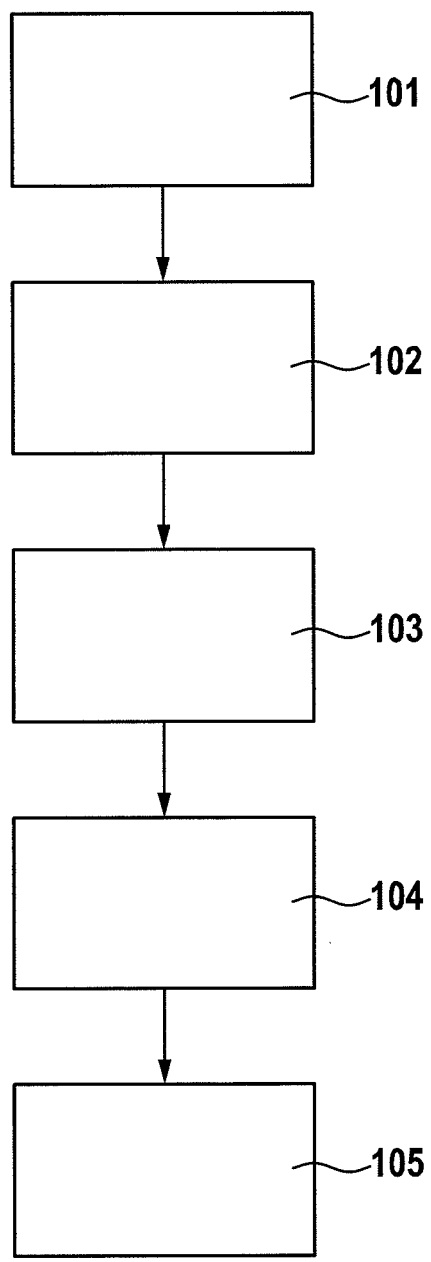
FIG. 4: Principle program sequence for reducing uncontrolled combustions.

The method for determining and reducing super knocks will now be explained exemplarily using FIG. 4. In Block 101, the pressure in the combustion chamber 16 is continuously measured over an operating cycle of the respective cylinder 2, 3, 4, 5 by means of the combustion chamber pressure sensors 15a, 15b, 15c, 15d. By the term operating cycle, the cycle of the four stroke gasoline engine being considered in the present example includes air intake, compression, ignition and discharge of exhaust gases. For the purpose of determining an incipient super knock, a threshold value comparison is carried out in Block 102 for the combustion chamber pressure p of each cylinder 2, 3, 4, 5, which is measured by said combustion chamber pressure sensors 15a, 15b, 15c, 15d. By means of the comparator 23, the combustion chamber pressure p prevailing in each case is compared with the pressure threshold value set in accordance with the engine's operating point. If the measured combustion chamber pressure p exceeds the pressure threshold value, a super knock, i.e. an uncontrolled combustion, is detected in its developing phase in Block 103. Immediately thereafter in Block 104, i.e still in the same operating cycle in which the pressure measurement occurs, the injection control unit 18 is activated, which initiates an injection of fuel via the injection nozzle 14a, 14b, 14c, 14d for the respective cylinder 2, 3, 4, 5. In Block 105, the injection of fuel into the combustion chamber 16 of the cylinder 2, 3, 4, 5, in which the super knock occurred, is discontinued for at least one of the ensuing operating cycles.

As an alternative to the comparison of the combustion chamber pressure with the pressure threshold value, a comparison of the gradient of the signal delivered by the combustion chamber pressure sensor 15a, 15b, 15c, 15d with the gradient threshold value can, however, also occur in Block 103 for the purpose of detecting a super knock. The pressure threshold value or the gradient threshold value is thereby defined as a function of the operating point of the gasoline engine 1 and is stored in an unspecified memory of the control unit 17

By reducing a super knock as a result of the additional injection of fuel, damaging effects to the gasoline engine 1 are prevented. This results from the fact that the vaporization occurring from the additional injection of fuel leads to a cooling down of the fuel/air mixture in the combustion chamber and that the combustibility of the fuel/air mixture is additionally reduced by the pronounced enrichment thereof.

The invention claimed is:

1. Method for reducing uncontrolled combustions in an internal combustion engine, which occur independently of the ignition by a spark plug, the method comprising:
   detecting an incipient uncontrolled combustion in the internal combustion engine; and
   reducing the incipient uncontrolled combustion in the same operating cycle of the internal combustion engine as an operating cycle in which the incipient uncontrolled combustion is detected.

2. The method according to claim 1, wherein the pressure in the combustion chamber of the internal combustion engine is compared with a predetermined pressure threshold, which is dependent on said engine's operating point, for the purpose of detecting the uncontrolled combustion, the presence of an uncontrolled combustion being suggested if the pressure threshold is exceeded.

3. The method according to claim 1, wherein a gradient of the increase in pressure in the combustion chamber is compared with a predetermined gradient threshold, which is dependent on the engine's operating point, for the purpose of detecting the uncontrolled combustion, the presence of an uncontrolled combustion being suggested if the gradient threshold is exceeded.

4. The method according to claim 1, wherein the position of the increase in pressure in the combustion chamber is compared with an outputted ignition angle for the purpose of detecting the uncontrolled combustion.

5. The method according to claim 1, wherein fuel is additionally introduced into the combustion chamber of the internal combustion engine to reduce the uncontrolled combustion in progress.

6. The method according to claim 5, wherein after completing the additional introduction of fuel into the combustion chamber of an affected cylinder, the injection of fuel is discontinued for at least one ensuing combustion cycle of the internal combustion engine.

7. Device for reducing uncontrolled combustions in an internal combustion engine, which occur independently of the ignition by a spark plug, the uncontrolled combustions being detected in the internal combustion engine, wherein after the detection of an incipient uncontrolled combustion the incipient uncontrolled combustion is reduced in the same operating cycle of the internal combustion engine as an operating cycle in which the incipient uncontrolled combustion is detected.

8. The device according to claim 7, wherein each cylinder of the internal combustion engine has a combustion chamber pressure sensor, the signals of which are scanned by a microcontroller, which in each case compares the amplitude of the pressure signal or the gradient of the pressure signals with a reference pressure and immediately induces fuel to be fed into the monitored cylinder of the internal combustion engine if the reference pressure is exceeded.

9. The device according to claim 8, wherein a first reference voltage corresponding to the pressure threshold value, which is dependent the engine's operating point, is present at a first output of the microcontroller and a second reference voltage corresponding to the gradient threshold value, which is dependent on the engine's operating point, is present at a second output of said microcontroller said first and second reference voltages are fed to a first, respectively a second, comparator, the signal of the combustion chamber pressure sensor being present at both comparators and the output of both comparators being connected to an injection control unit, which activates an injection valve for an additional fuel feed into the monitored cylinder of the internal combustion engine if the first or second reference voltage is exceeded.

10. The device according to claim 8, wherein the microcontroller is a constituent part of the combustion chamber pressure sensor.

\* \* \* \* \*